(12) United States Patent
Li (10) Patent No.: US 9,525,159 B2
(45) Date of Patent: Dec. 20, 2016

(54) BATTERY COVER ASSEMBLY FOR PORTABLE ELECTRONIC DEVICE

(71) Applicants: SHENZHEN FUTAIHONG PRECISION INDUSTRY CO., LTD., Shenzhen (CN); Chi Mei Communication Systems, Inc., New Taipei (TW)

(72) Inventor: Guo-Dong Li, Shenzhen (CN)

(73) Assignees: SHENZHEN FUTAIHONG PRECISION INDUSTRY CO., LTD., Shenzhen (CN); Chi Mei Communication Systems, Inc., New Taipei (TW)

( * ) Notice: Subject to any disclaimer, the term of this patent is extended or adjusted under 35 U.S.C. 154(b) by 920 days.

(21) Appl. No.: 13/725,367

(22) Filed: Dec. 21, 2012

(65) Prior Publication Data

US 2013/0273982 A1 Oct. 17, 2013

(30) Foreign Application Priority Data

Apr. 16, 2012 (CN) .......................... 2012 1 0109923

(51) Int. Cl.
*H04M 1/00* (2006.01)
*H01M 2/10* (2006.01)

(52) U.S. Cl.
CPC ......... *H01M 2/1066* (2013.01); *H01M 2/1022* (2013.01)

(58) Field of Classification Search
CPC ............ H01L 2924/0002; G11B 31/00; H01M 2/1066; H01M 2220/30; A61M 2205/8206; G02B 7/28; G02B 6/0016
USPC ............... 455/575.1, 558, 128, 97, 163, 100
See application file for complete search history.

(56) References Cited

U.S. PATENT DOCUMENTS

| 2008/0193837 A1* | 8/2008 | Lu ....................... H04M 1/0262 429/163 |
| 2009/0059505 A1* | 3/2009 | Iwamoto ............... G06F 1/1616 361/679.31 |
| 2010/0330407 A1* | 12/2010 | Lee ..................... H01M 2/1066 429/97 |
| 2011/0305934 A1* | 12/2011 | Chang ................. H01M 2/1094 429/100 |

* cited by examiner

*Primary Examiner* — Joseph Arevalo
(74) *Attorney, Agent, or Firm* — Zhigang Ma (57) ABSTRACT

A battery cover assembly for a portable electronic device includes a base body, a battery cover and an operating member. The base body defines a first groove, and a first block and a second block received in the first groove. The battery cover defines a second groove and a support frame integrally formed in the second groove. The support frame defines a through hole and a finger portion extending into the through hole. The operating member is attached to the battery cover, and includes a column and a projection formed at one side of the column, the column extending into the through hole, and the projection abutting against the finger portion. The operating member is slid to allow the battery cover to releasably latch to the base body.

10 Claims, 9 Drawing Sheets

BATTERY COVER ASSEMBLY FOR PORTABLE ELECTRONIC DEVICE

BACKGROUND

1. Technical Field

The present disclosure generally relates to battery cover assemblies and, particularly, to a battery cover assembly for use in a portable electronic device.

2. Description of Related Art

Batteries are widely used in portable electronic devices, such as personal digital assistants (PDAs), mobile phones, for example. Conventional batteries are attachable and received in the electronic device, and battery covers are designed to connect with housings of the electronic devices to package the batteries. Batteries are replaced by opening the battery covers when, for example, the batteries are damaged and/or dead (i.e. no longer rechargeable).

Although battery cover assemblies may be simple, engagement between the battery cover and the housing of the mobile phone can be too firm to be easily detached from each other.

Therefore, there is room for improvement within the art.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views.

DETAILED DESCRIPTION

Figure 1:
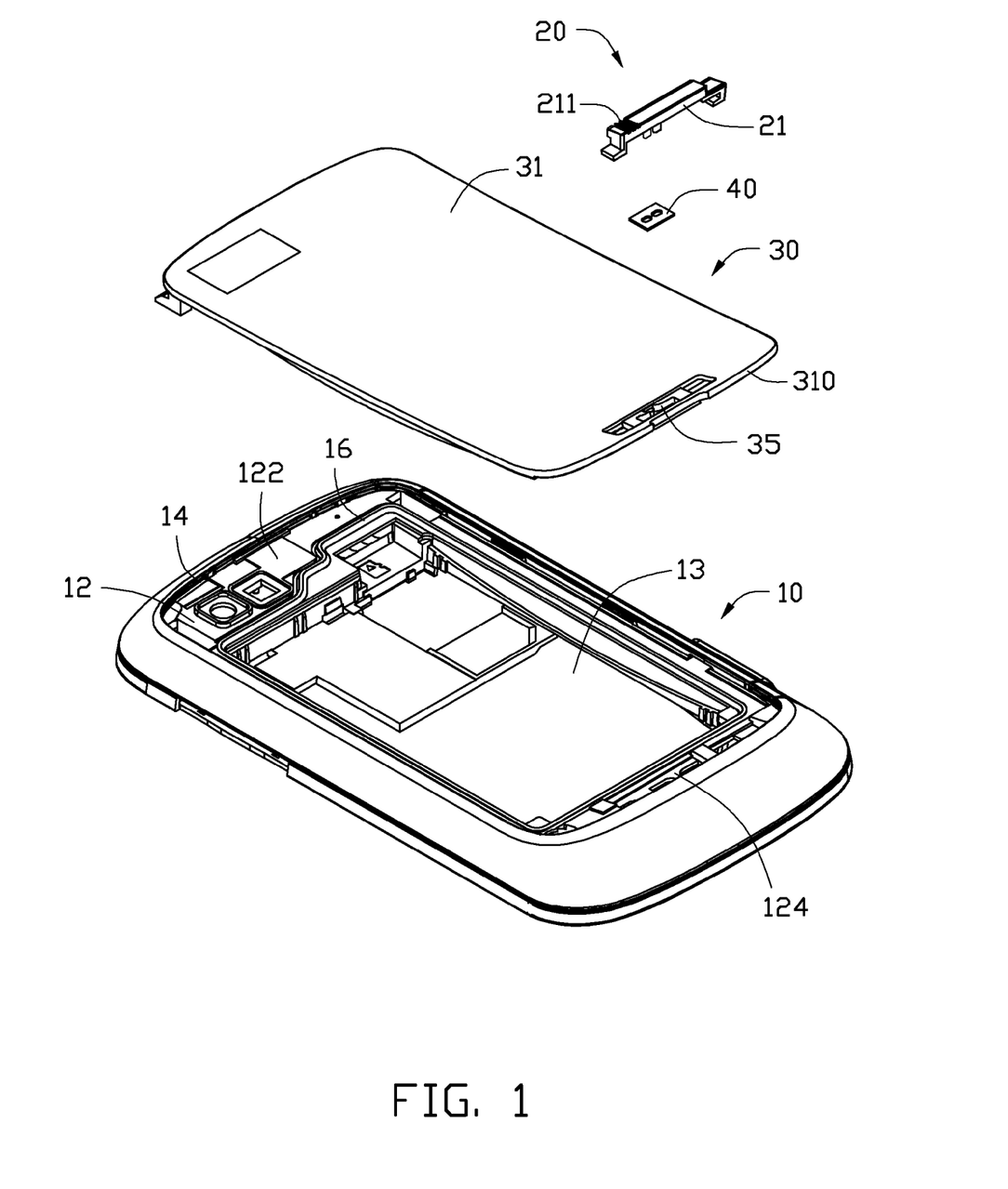
FIG. 1 is an exploded, isometric view of a portable electronic device employing a battery cover assembly including a base body, an operating member, a latching member and a battery cover in accordance with an exemplary embodiment.

FIG. 1 shows a portable electronic device, such as a mobile phone, employing a battery cover assembly. The mobile phone is an exemplary application, for the purposes of describing details of an exemplary embodiment of a battery cover assembly. The battery cover assembly incorporates a base body 10, an operating member 20, a battery cover 30, and a latching member 40. The operating member 20 is slidably located on the battery cover 30 by the latching member 40 and is configured for latching the battery cover 30 on the base body 10.

Figure 2:
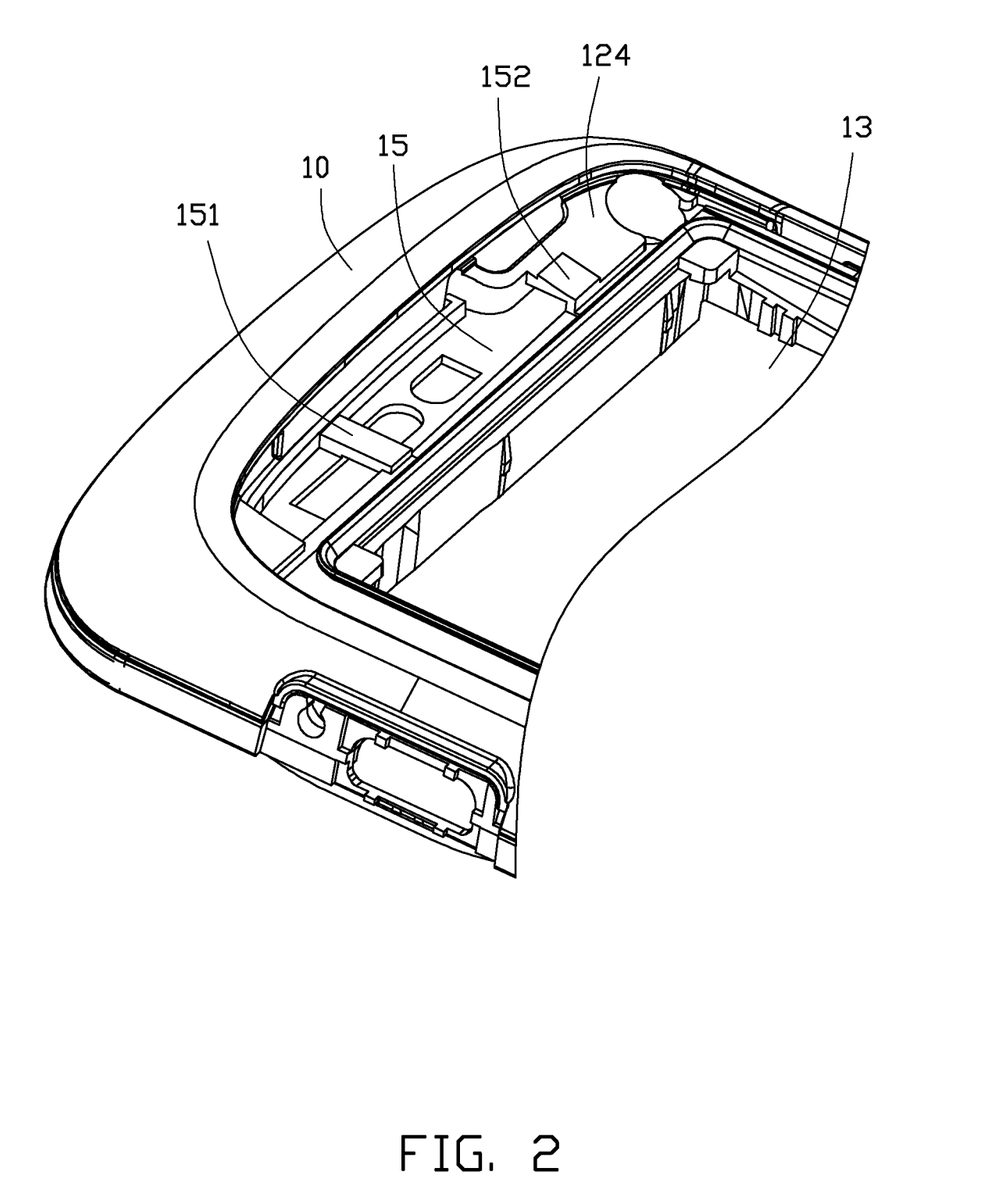
FIG. 2 is an enlarged view of a second engaging portion of the base body shown in FIG. 1.

The base body 10 defines a latching cavity 12 configured for engaging with the battery cover 30. The latching cavity 12 includes a first engaging portion 122, a second engaging portion 124, and a battery cavity 13. The first engaging portion 122 has two slots 14. Referring to FIG. 2, the second engaging portion 124 defines a first groove 15, and a first block 151 and a second block 152 are received in the first groove 15. The battery cavity 13 is in the latching cavity 12 for receiving a battery (not shown). A sealing cushion 16 is positioned around the battery cavity 13.

Figure 3:
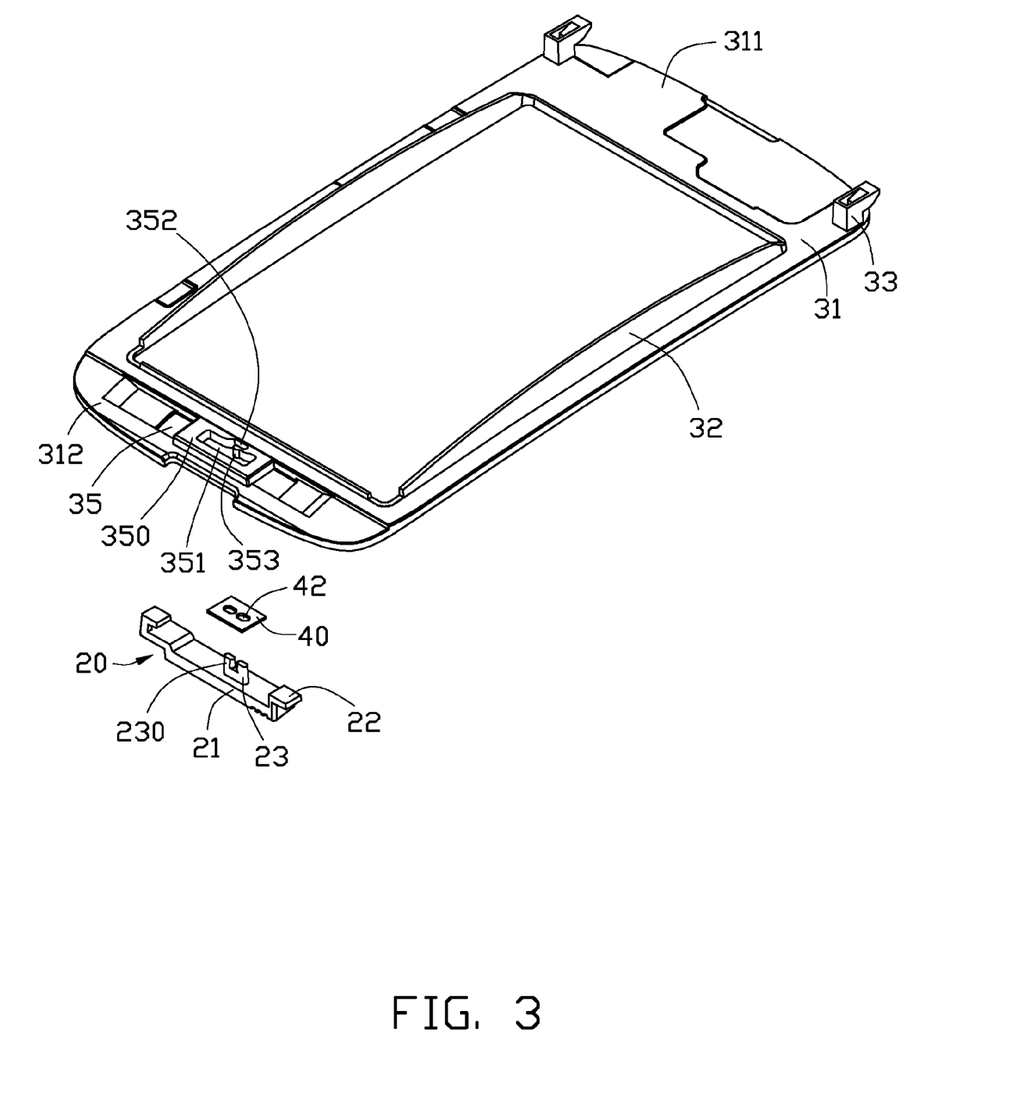
FIG. 3 is an enlarged view of the battery cover, the latching member and the operating member shown in FIG. 1 from another aspect.

FIG. 3 shows that the battery cover 30 has a cover body 31 configured for covering the latching cavity 12. The cover body 31 includes a first end 311 and a second end 312. The first end 311 and the second end 312 are tilted relative to the cover body 31. Two clasps 33 extend from the first end 311 of the cover body 31. A second groove 35 is defined in the second end 312 of the cover body 31. A support frame 350 is integrally formed in the second groove 35. The support frame 350 defines a through hole 351 and a finger portion 353 extends into the through hole 351. A branch passage 352 is defined at one side of the finger portion 353 to provide a deformation space of the finger portion 353. A flange plate 32 extends from one side surface of the cover body 31 configured for abutting against the sealing cushion 16.

Figure 4:
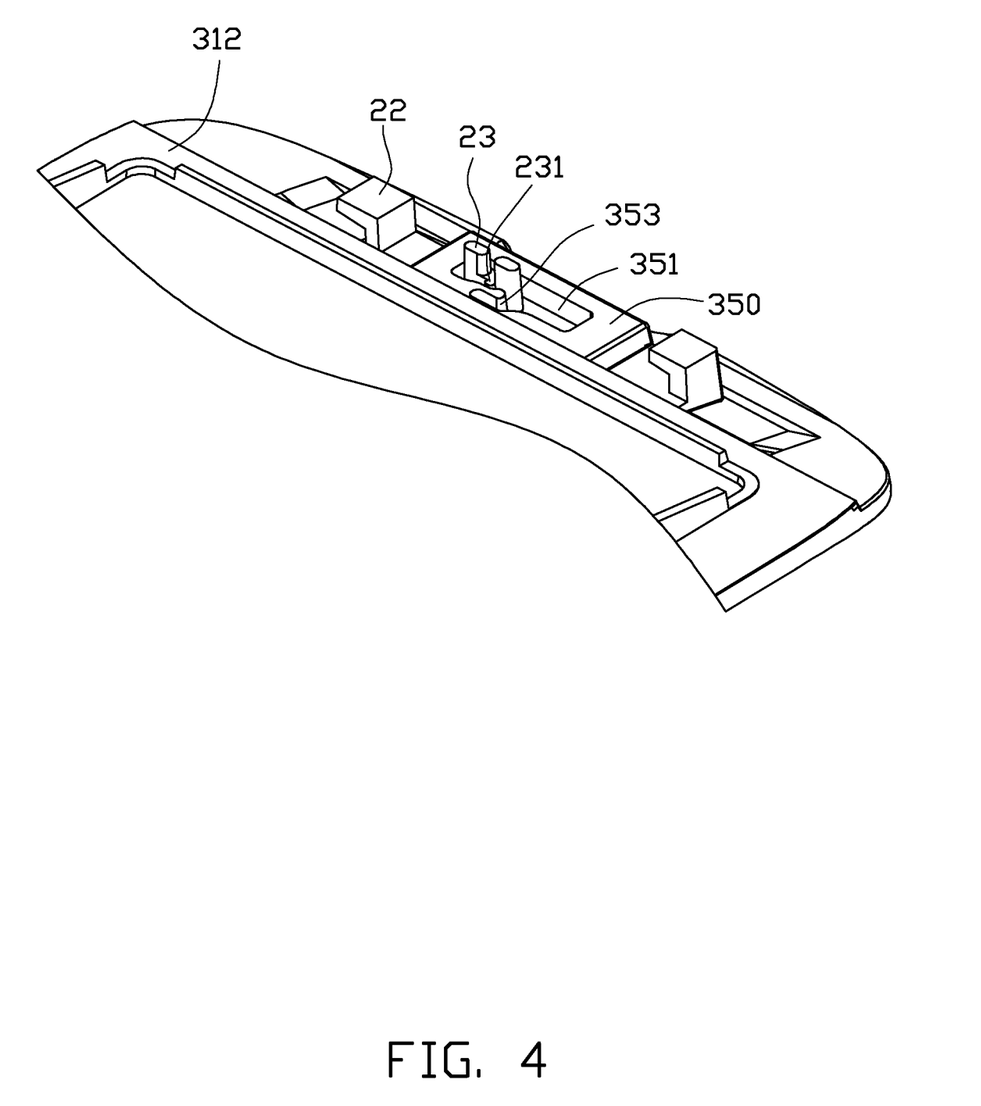
FIG. 4 is an assembled view of FIG. 3.

The operating member 20 has a plate-shaped operating member body 21. An L-shaped hook 22 extends from each of two opposite ends of the operating member body 21. A plurality of ribs 211 extend from one side surface of the operating member body 21, for conveniently operating the operating member 20. A column 23 extends from another side surface of the operating member body 21. One distal end of the column 23 includes two parallel posts 230. FIG. 4 shows that a projection 231 is formed at one side of the column 23. The projection 231 is configured for latching with the finger portion 353. The latching member 40 is configured for latching the operating member 20 to the battery cover 30. In this exemplary embodiment, the latching member 40 defines two apertures 42. The apertures 42 are engaged with the posts 230 to latch the latching member 40 on the operating member 20.

Figure 5:
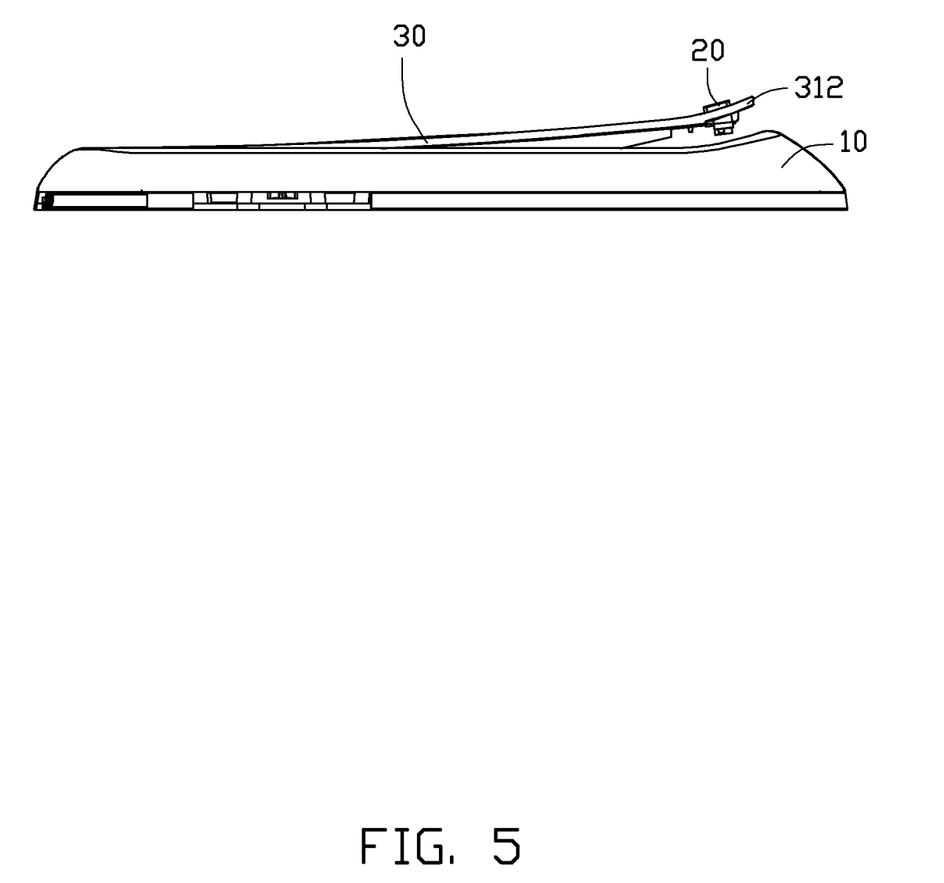
FIG. 5 is a side view of the battery cover assembly showing the battery cover is partially attached to the base body.
Figure 6:
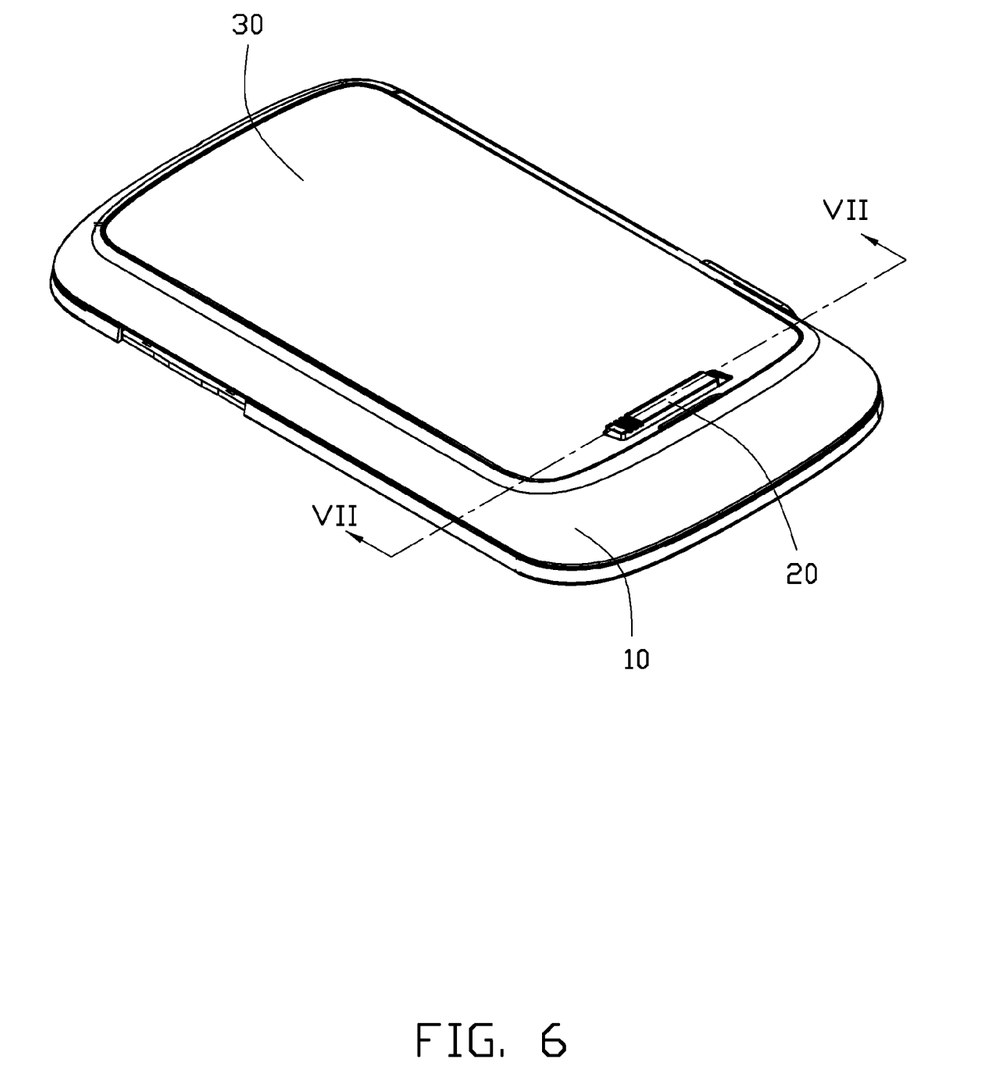
FIG. 6 is an assembled view of FIG. 1.
Figure 7:
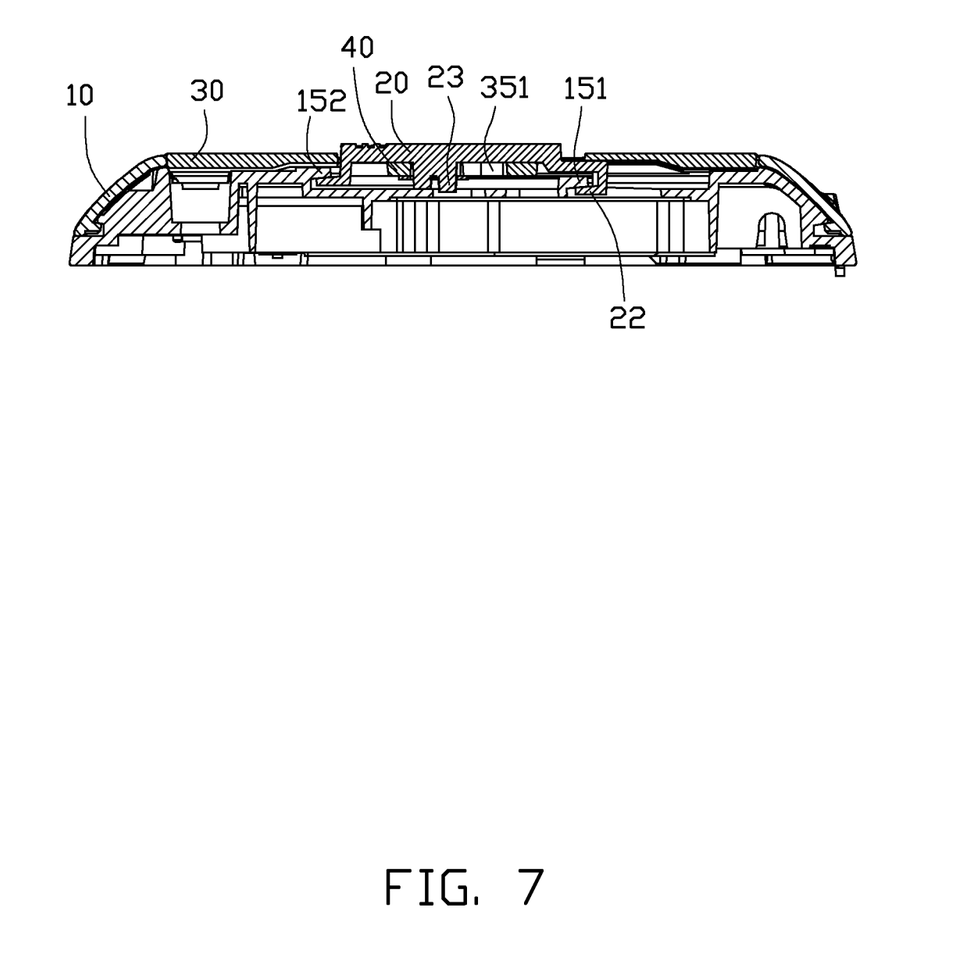
FIG. 7 is a cross sectional view of the battery cover assembly of FIG. 6 along line VII-VII.

During assembly of the battery cover assembly, FIGS. 5 to 7 show that the operating member 20 is first attached to the battery cover 30. The hooks 22 extend into the second groove 35 on the second end 312. The column 23 extends into the through hole 351 and is exposed from another side of the battery cover 30. Then, the posts 230 are tightly engaged in the apertures 42 of the latching member 40, to prevent the operating member 20 from separating from the battery cover 30. The battery cover 30 with the operating member 20 is attached to the base body 10. The clasps 33 of the battery cover 30 on the first end 311 are engaged in the slots 14. The second end 312 of the battery cover 30 is pressed downward to allow the hooks 22 to be latched with the first block 151 and the second block 152 in the first groove 15. The projection 231 abuts against the finger portion 353 to lock the operating member 20 in a predetermined position relative to the battery cover 30. Thus, the battery cover 30 is assembled in the base body 10.

Figure 8:
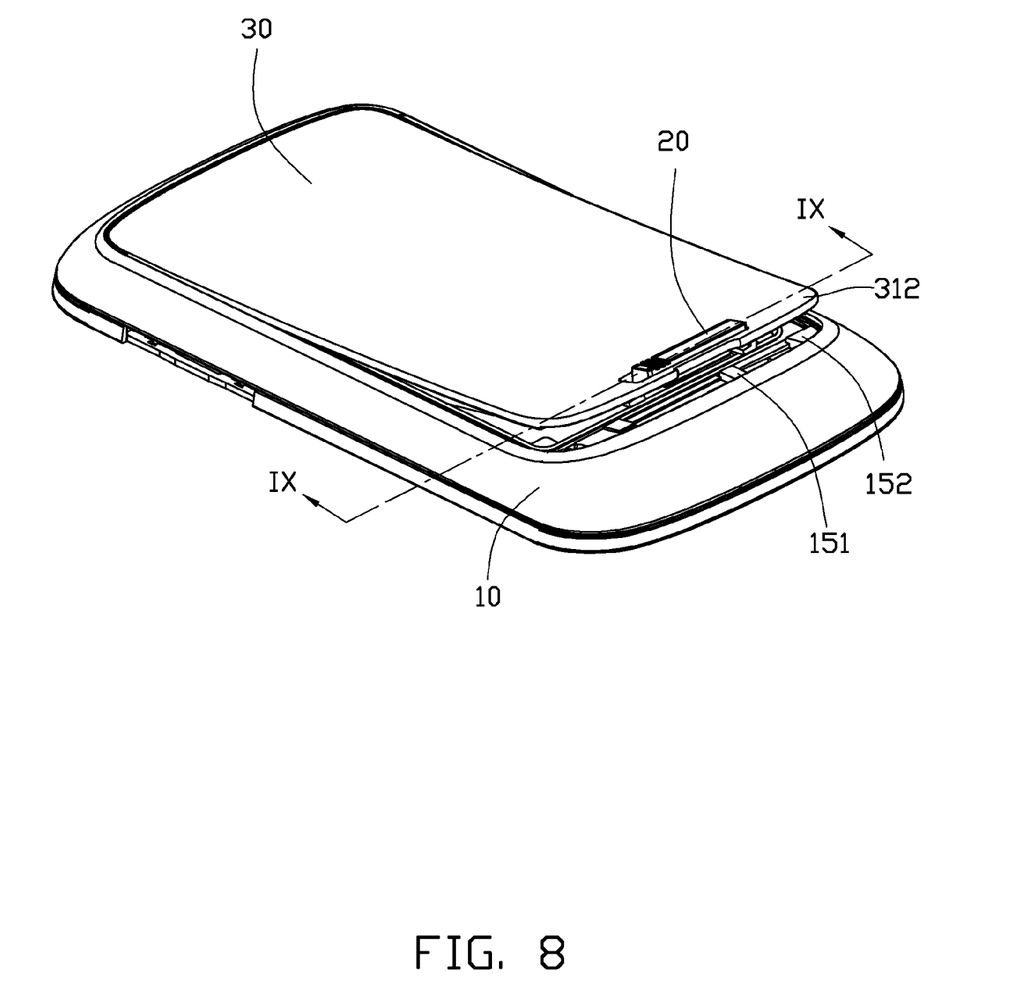
FIG. 8 is an opened state of FIG. 6.
Figure 9:
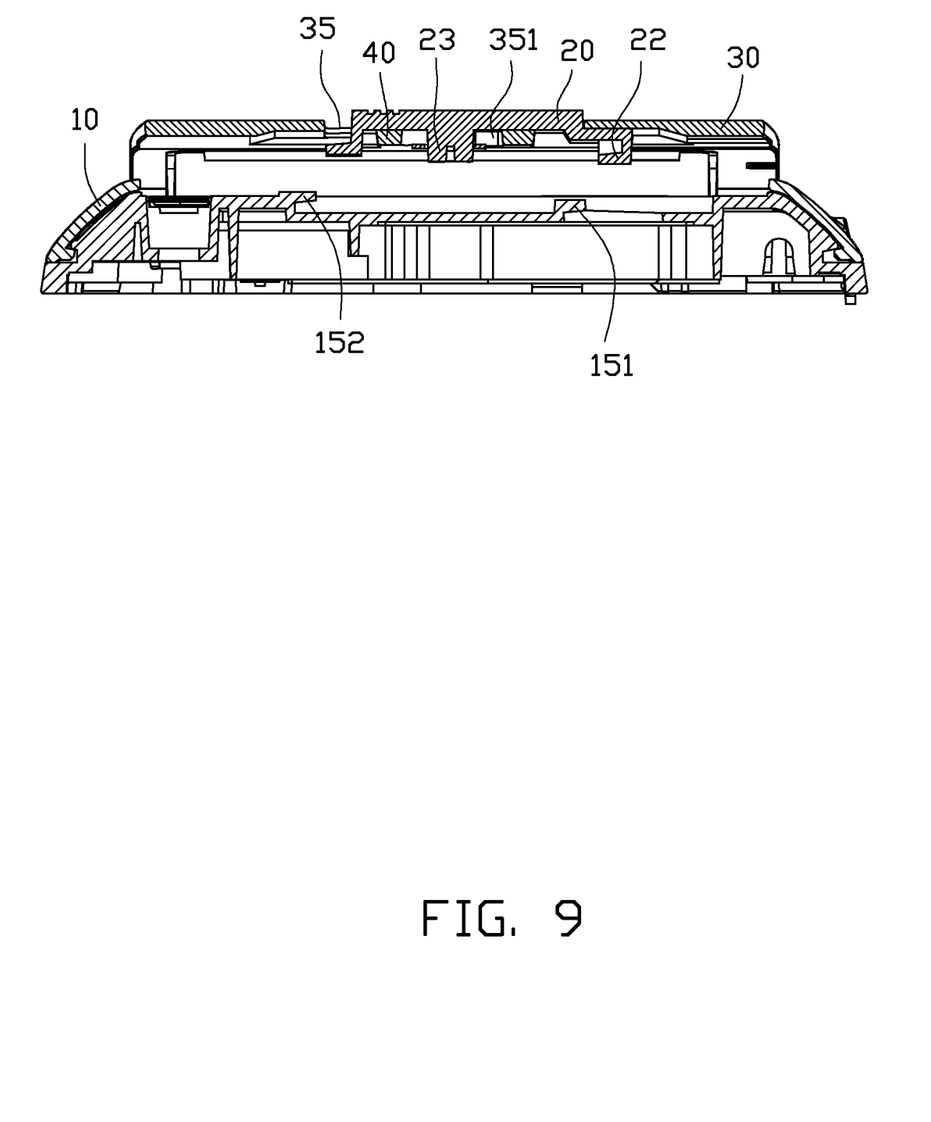
FIG. 9 is a cross sectional view of the battery cover assembly of FIG. 8 along line IX-IX.

FIGS. 8 and 9 show that when the battery cover 30 is to be opened, the operating member 20 is slidably pressed to allow the column 23 to slide in the through hole 351. The projection 231 is unlocked with the finger portion 353. The hooks 22 separate from the first block 151 and the second block 152. The second end 312 of the battery cover 30 is released, and the sealing cushion 16 returns elastic force to push the second end 312 of the battery cover 30 to be tilted. The clasps 33 exit from the slots 14 and the battery cover 30 can then be removed.

As described above, the exemplary embodiment provides a battery cover assembly for portable electronic devices, such as mobile phones. The battery cover of the battery cover assembly can be easily opened and more user-friendly.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A battery cover assembly for a portable electronic device, the battery cover assembly comprising:
    a base body defining a latching cavity, the latching cavity comprising a first engaging portion and a second engaging portion, the second engaging portion defining a first groove, and a first block and a second block received in the first groove;
    a battery cover comprising a cover body, the cover body comprising a first end and a second end, the first end being detachable with the first engaging portion, the second end comprising a second groove and a support frame integrally formed in the second groove, and the support frame comprising a through hole and a finger portion extending into the through hole; and
    an operating member attached to the battery cover, the operating member comprising a column and a projection formed at one side of the column, the column extending into the through hole, and the projection-resisting the finger portion;
    wherein the operating member is slid to allow the second end of the battery cover to releasably latch to the second engaging portion of the base body; and
    wherein the operating member has a plate-shaped operating member body, an L-shaped hook extends from each of two opposite ends of the plate-shaped operating member body, and the L-shaped hooks engages with the first block and the second block.

2. The battery cover assembly as claimed in claim 1, wherein the base body comprises a sealing cushion; and the battery cover comprises a flange plate extending from one side surface thereof, for abutting against the sealing cushion when the battery is assembled in the base body and returning elastic force to push the battery cover to be tilted.

3. The battery cover assembly as claimed in claim 1, further comprising a latching member; wherein one distal end of the column includes two parallel posts, and the latching member defines two apertures engaging with the posts.

4. The battery cover assembly as claimed in claim 1, wherein the first end and the second end are tilted relative to the cover body, the latching cavity further comprises a battery cavity for receiving a battery, the cover body is configured for covering the latching cavity.

5. The battery cover assembly as claimed in claim 1, wherein two clasps extend from the first end of the cover body, and the first engaging portion of the base body defines two slots engaging with the two clasps.

6. A portable electronic device comprising: a base body defining a latching cavity, the latching cavity comprising a first engaging portion and a second engaging portion, the second engaging portion comprising a first block and a second block; a battery cover comprising a cover body, the cover body comprising a first end and a second end, the first end being detachable with the first engaging portion, the second end comprising a support frame, the support frame comprising a through hole and a finger portion extending into the through hole; and an operating member attached to the battery cover, the operating member comprising a column and a projection formed at one side of the column, the column extending into the through hole, and the projection abutting resisting the finger portion; wherein the operating member is slid to allow the second end of the battery cover to releasably latch to the second engaging portion of the base body; and
    wherein the operating member has a plate-shaped operating member body, an L-shaped hook extends from each of two opposite ends of the plate-shaped operating member body, and the L-shaped hooks engaging with the first block and the second block.

7. The portable electronic device as claimed in claim 6, further comprising a latching member; wherein one distal end of the column comprises two parallel posts, the latching member defines two apertures engaging with the parallel posts.

8. The portable electronic device as claimed in claim 6, wherein the first end and the second end are tilted relative to the cover body, the latching cavity further comprises a battery cavity for receiving a battery, the cover body is configured for covering the latching cavity.

9. The portable electronic device as claimed in claim 8, wherein the base body comprises a sealing cushion; the sealing cushion is positioned around the battery cavity, the battery cover comprises a flange plate extending from one side surface thereof, for abutting against the sealing cushion when the battery is assembled in the base body and returning elastic force to push the battery cover to be tilted.

10. The portable electronic device as claimed in claim 6, wherein two clasps extend from the first end of the cover body, and the first engaging portion of the base body defines two slots engaging with the two clasps.

* * * * *